(12) United States Patent
Aoki et al.

(10) Patent No.: US 9,387,729 B2
(45) Date of Patent: Jul. 12, 2016

(54) PNEUMATIC TIRE

(75) Inventors: Naotoshi Aoki, Kodaira (JP); Yukihiro Kiwaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 661 days.

(21) Appl. No.: 13/817,727

(22) PCT Filed: Aug. 25, 2011

(86) PCT No.: PCT/JP2011/069218
§ 371 (c)(1),
(2), (4) Date: Feb. 19, 2013

(87) PCT Pub. No.: WO2012/026545
PCT Pub. Date: Mar. 1, 2012

(65) Prior Publication Data
US 2013/0146190 A1 Jun. 13, 2013

(30) Foreign Application Priority Data

Aug. 25, 2010 (JP) .................. 2010-188378
Aug. 25, 2011 (JP) .................. 2011-183308

(51) Int. Cl.
*B60C 11/13* (2006.01)
*B60C 11/04* (2006.01)
(Continued)

(52) U.S. Cl.
CPC ........... *B60C 11/045* (2013.01); *B60C 11/0306* (2013.04); *B60C 11/12* (2013.01);
(Continued)

(58) Field of Classification Search
CPC ............ B60C 11/0306; B60C 11/0309; B60C 11/1369; B60C 11/1323; B60C 11/1384; B60C 11/1392; B60C 11/1376; B60C 2011/1338; B60C 11/1236; B60C 2011/0348
USPC ...................................... 152/209.27
See application file for complete search history.

(56) References Cited

U.S. PATENT DOCUMENTS

| 5,223,059 A | 6/1993 | Himuro |
| 2009/0266459 A1* | 10/2009 | Sato ............. B60C 11/0306 152/209.25 |
| 2010/0089509 A1 | 4/2010 | Ochi |

FOREIGN PATENT DOCUMENTS

JP 2-14904 A 1/1990
JP 2-20407 A 1/1990
(Continued)

OTHER PUBLICATIONS

English machine translation of JP2001-225611, dated Aug. 2001.*
(Continued)

*Primary Examiner* — Steven D Maki
*Assistant Examiner* — Robert Dye
(74) *Attorney, Agent, or Firm* — Sughrue Mion, PLLC

(57) ABSTRACT

Both wet weather performance and steering stability performance are achieved. Lateral main grooves (16) formed in a tread (12) extend in a direction intersecting with circumferential main grooves (14) and open onto the circumferential main grooves (14). Water between the tread (12) and a road surface during wet weather running is accordingly discharged through the lateral main grooves (16) to the circumferential main grooves (14). The end portions of the lateral main grooves (16) opening onto the circumferential main groove (14) are provided with intersection portions 18 where first land portions (21) and second land portions (22) adjacent to each other in the tire circumferential direction at a lateral main groove (16) support each other in the tire width direction. The end portions at the circumferential main groove (14) side of the first land portions (21) and the second land portions (22) do not therefore readily tilt over even when a large slip angle is imparted to the tire.

5 Claims, 11 Drawing Sheets

(51) Int. Cl.
  *B60C 11/03* (2006.01)
  *B60C 11/12* (2006.01)

(52) U.S. Cl.
  CPC .............. *B60C 11/125* (2013.04); *B60C 11/13* (2013.01); *B60C 11/1323* (2013.04); *B60C 11/1369* (2013.04); *B60C 11/1392* (2013.04); *B60C 2011/0383* (2013.04); *B60C 2011/1209* (2013.04)

(56) References Cited

FOREIGN PATENT DOCUMENTS

| | | |
|---|---|---|
| JP | 4-201607 A | 7/1992 |
| JP | 6-48119 A | 2/1994 |
| JP | 2000318411 A | 11/2000 |
| JP | 2001-225611 A | 8/2001 |
| JP | 2003-154811 A | 5/2003 |
| JP | 2004-98938 A | 4/2004 |
| JP | 2006-224770 A | 8/2006 |
| JP | 2008-149995 A | 7/2008 |
| JP | 2008-174197 A | 7/2008 |
| JP | 4329912 B1 | 9/2009 |

OTHER PUBLICATIONS

International Search Report for PCT/JP2011/069218 dated Dec. 6, 2011.
PCT/IPEA/409 for PCT/JP2011/069218 dated Dec. 19, 2012.
Communication dated Jan. 6, 2015 from the Japanese Patent Office in counterpart application No. 2010-188378.

* cited by examiner

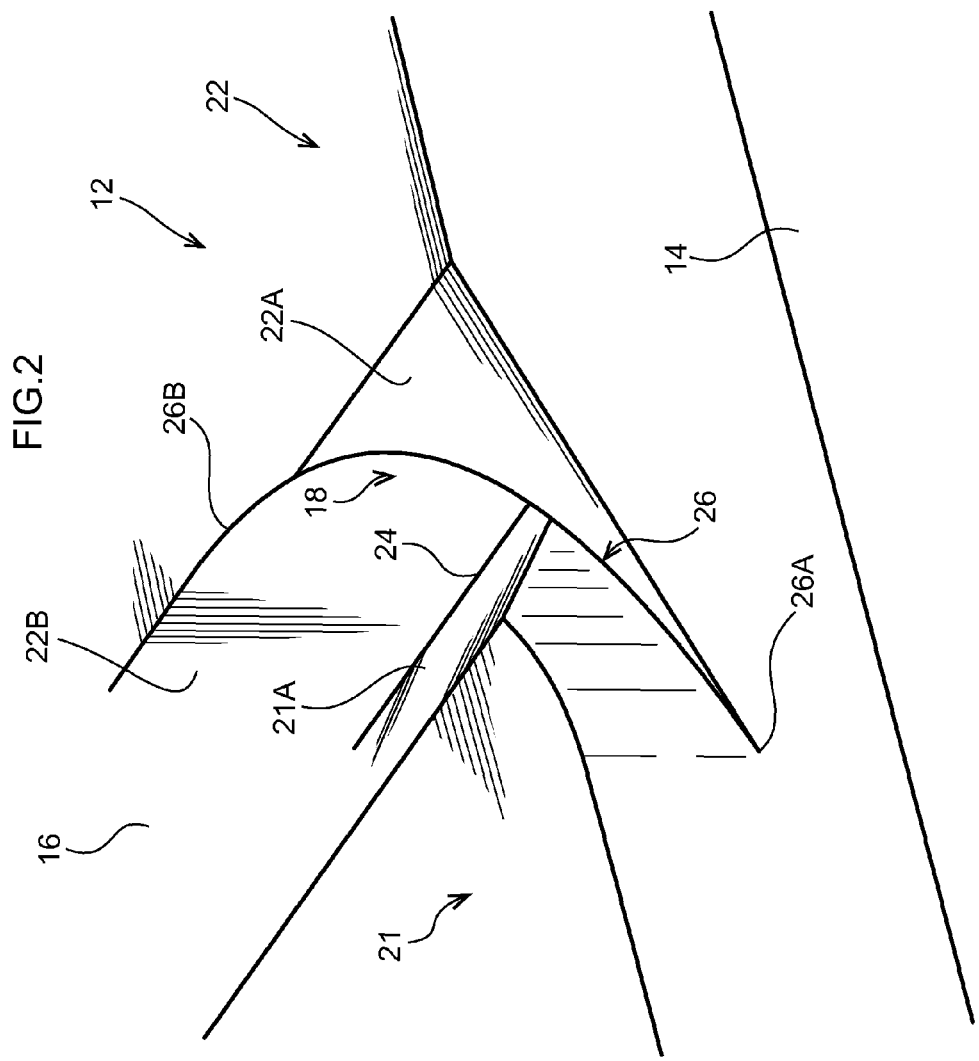

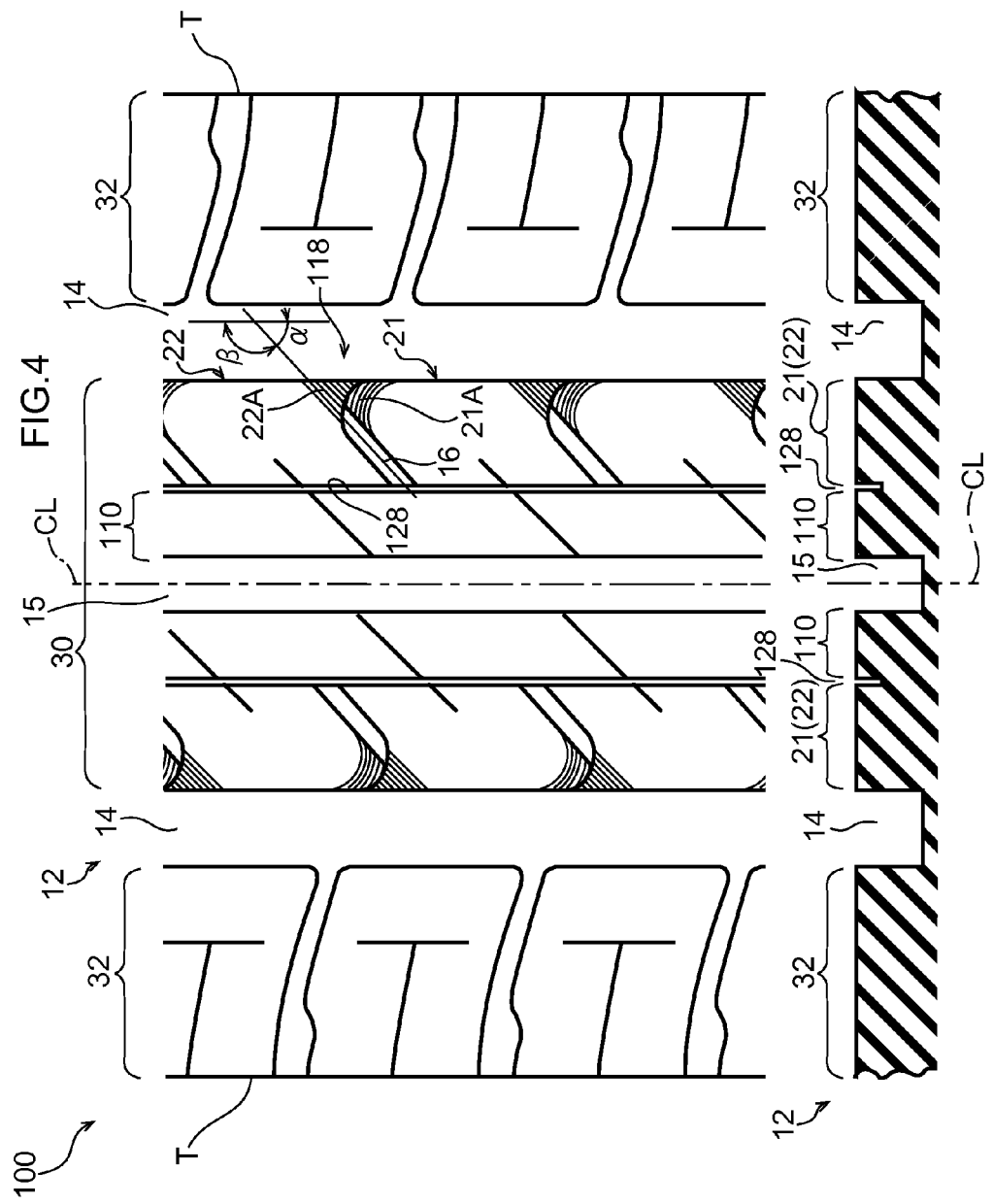

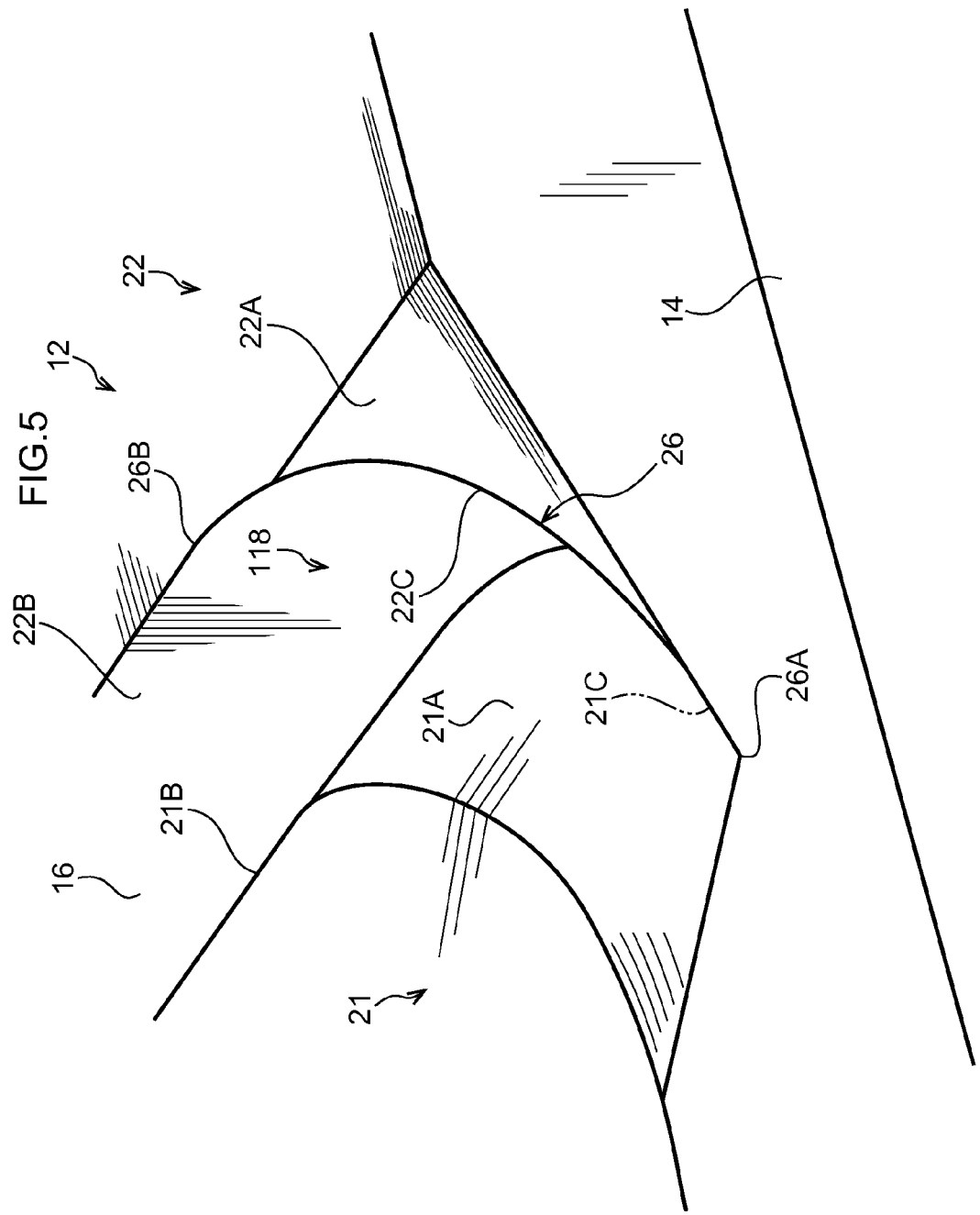

PNEUMATIC TIRE

CROSS REFERENCE TO RELATED APPLICATIONS

This application is a National Stage of International Application No. PCT/JP2011/069218 filed Aug. 25, 2011, claiming priority based on Japanese Patent Application Nos. 2010-188378 filed Aug. 25, 2010 and 2011-183308 filed Aug. 25, 2011, the contents of all of which are incorporated herein by reference in their entirety.

TECHNICAL FIELD

The present invention relates to a pneumatic tire.

BACKGROUND ART

A structure is proposed wherein locally raised platforms are provided to portions of groove bottoms at the end portions of lateral grooves of a tread, such that contact with the platforms suppresses blocks from tilting over towards lateral groove sides of the blocks (see Patent Document 1). A structure is also proposed wherein platforms are employed in an attempt to suppress the tilting over amount at both ends of blocks, and reduce uneven wear of the blocks overall (see Patent Document 1).

Moreover, structures are further proposed wherein blocks are provided adjacent to ribs at tire width direction outsides (see Patent Document 2 and Patent Document 3).

PATENT DOCUMENTS

Patent Document 1: Japanese Patent Application Laid-Open (JP-A) No. 2-20407
Patent Document 2: JP-A No. 2003-154811
Patent Document 3: JP-A No. 2006-224770

SUMMARY OF INVENTION

Technical Problem

Configuration is made such that water flows from lateral main grooves towards circumferential direction main grooves of a tread during wet road surface running, thereby securing water discharge performance from the ground contact face and improving wet weather performance.

However, in structures wherein lateral main grooves open into circumferential direction main grooves, a localized reduction in rigidity can occur at end portions on the circumferential direction main groove side of blocks that are partitioned by circumferential direction main grooves and lateral main grooves. It is conceivable that end portions on the circumferential main groove side of these blocks may readily tilt over when the tire is imparted with a large slip angle. It is conceivable that this would be particularly significant when lug grooves are set at a large slope angle to the tire width direction in an attempt to improve such properties as water discharge performance or noise characteristics.

In the related example given in Patent Document 1, gaps are present between the blocks and the platforms, and there is conceivable room for improvement from the perspective of suppressing tilting over of the blocks. Likewise, in the related examples of Patent Document 2 and Patent Document 3, large movement occurring at the leading ends of the blocks is conceivable.

In consideration of the above circumstances, an object of the present invention is to achieve both wet weather performance and steering stability performance.

Solution to Problem

A first aspect of the present invention is a pneumatic tire including: land portions that are provided at a tread and are segmented by a circumferential main groove extending along a tire circumferential direction and by lateral main grooves that extend in a direction intersecting with the circumferential main groove and that open onto the circumferential main groove; and intersection portions that are provided at the tread at end portions of the lateral main grooves where the lateral main grooves open onto the circumferential main groove such that a first of the land portions and a second of the land portions adjacent to each other in the tire circumferential direction at each of the lateral main grooves intersect so as to support each other in the tire width direction.

In the pneumatic tire according to the first aspect, the lateral main grooves are formed in the tread, extend in a direction intersecting with the circumferential main groove and open onto the circumferential main groove. Water between the tread and the road surface is accordingly discharged through the lateral main grooves to the circumferential main grooves during wet weather running. The wet weather performance can accordingly be secured.

Moreover, the pneumatic tire according to the first aspect includes the intersection portions that are provided at the tread at end portions of the lateral main grooves where the lateral main grooves open onto the circumferential main groove such that the first of the land portions and the second of the land portions adjacent to each other in the tire circumferential direction at each of the lateral main grooves intersect so as to support each other in the tire width direction. The end portions at the circumferential direction groove side of the land portions accordingly do not readily tilt over even when a large slip angle is imparted to the tire. Steering stability performance can accordingly be secured.

According to the pneumatic tire of the first aspect it is thus possible to achieve both wet weather performance and steering stability performance.

A pneumatic tire of a second aspect of the present invention is the pneumatic tire according to the first aspect wherein: at each of the intersection portions a first sloping face is formed at the first land portion, the first sloping face sloping in a tread depth direction towards the second land portion side; at each of the intersection portions a second sloping face is formed at the second land portion, the second sloping face sloping in the tread depth direction towards the first land portion side and intersecting with the first sloping face as viewed from an extension direction of the lateral main groove; and the first sloping face and the second sloping face configure groove walls of the lateral main groove at each of the intersection portions.

In the pneumatic tire according to the second aspect, as viewed from the extension direction of the lateral main groove, the first sloping face of the first land portion and the second sloping face of the second land portion intersect with each other, and the first sloping face and the second sloping face configure groove walls of the lateral main groove at each of the intersection portions. Consequently, water discharge performance from the lateral main grooves to the circumferential main grooves is secured, and the first land portion and the second land portion support each other in the tire width direction, enabling tilting over of the end portion of the land portions on the lateral main groove side to be suppressed, and for steering stability performance to secured.

A third aspect of the present invention is a pneumatic tire according to the first aspect or the second aspect wherein: the lateral main grooves extend at an angle to the tire width direction; the first land portion is positioned on an acute angle side of an intersection angle between the circumferential main groove and the lateral main groove at the intersection portions; and the second land portion is positioned on an obtuse angle side of the intersection angle and extends between the first land portion and the circumferential main groove.

In the pneumatic tire according to the third aspect, the second land portion is positioned on the obtuse angle side of the intersection angle and extends between the first land portion and the circumferential main groove. The first land portion positioned on the acute angle side is accordingly supported by the second land portion positioned on the obtuse angle side when the tire is imparted with a large slip angle, and can be suppressed from tilting over.

A pneumatic tire of a fourth aspect of the present invention is any one aspect of the first aspect to the third aspect wherein the first land portion and the second land portion are connected together at the intersection portion.

In the pneumatic tire according to the fourth exemplary embodiment, the first land portion and the second land portion are connected together at the intersection portion, and so the land portion rigidity at the intersection portion is raised. Tilting over of the land portions when a large slip angle is imparted to the tire can accordingly be further suppressed.

A fifth aspect of the present invention is the pneumatic tire of any one aspect of the first aspect to the fourth aspect wherein the width of the lateral main groove at the tread surface of the intersection portions is 5% to 60% of the width of the circumferential main groove.

The lower limit is set here at 5% since the groove volume is reduced and water discharge performance deteriorate significantly below this level. The upper limit is set at 60% since the rigidity falls and the steering stability performance deteriorates above this level.

In the pneumatic tire according to the fifth aspect, a high level of both wet weather performance and steering stability performance can be achieved due to thus appropriately setting the proportion of the width of the lateral main grooves with respect to the width of the circumferential main grooves in the tread surface at the intersection portions.

A sixth aspect of the present invention is the pneumatic tire of any one aspect of the first aspect to the fifth aspect wherein the depth of the lateral main grooves at the intersection portions is 10% to 90% of the depth of the lateral main grooves at locations other than the intersection portions.

The lower limit is set here at 10% since the groove volume inside the lateral main groove decreases and water discharge performance deteriorates below this level. The upper limit is set at 90% since the rigidity falls and steering stability performance deteriorates above this level.

In the pneumatic tire according to the sixth aspect, both water discharge performance in the lateral main grooves and steering stability performance can be achieved since the proportion of the depth of the lateral main grooves at the intersection portions is appropriately set.

A seventh aspect of the present invention is the pneumatic tire of any one aspect of the first aspect to the sixth aspect wherein the angle of slope of the first sloping face with respect to the tire radial direction is 0° to 60°.

The lower limit is set here as 0° since the groove volume of the lateral main groove is reduced and water discharge performance deteriorates below this level. The upper limit is set at 60° since rigidity falls and steering stability performance deteriorates above this level.

In the pneumatic tire according to the seventh aspect, both water discharge performance inside the lateral main grooves and steering stability performance can be achieved by appropriately setting the slope angle of the first sloping face with respect to the tire radial direction in this manner.

An eighth aspect of the present invention is the pneumatic tire of any one aspect of the first aspect to the seventh aspect wherein the angle of slope of the second sloping face with respect to the tire radial direction is 10° to 80°.

The lower limit is set here as 10° since below this level tilting over of the first land portion on the obtuse angle side becomes large when imparted with a large slip angle. The upper limit is set as 80° since the water discharge performance from the lateral main grooves to the circumferential main grooves 14 deteriorates above this limit.

In the pneumatic tire according to the eighth aspect, by appropriately setting the slope angle of the second sloping face with respect to the tire radial direction in this manner, tilting over of the first land portion on the obtuse angle side can be suppressed while also suppressing any reduction in water discharge performance of the lateral main grooves.

A ninth aspect of the present invention is a pneumatic tire including: land portions that are provided at a tread and are segmented by a circumferential main groove extending along the tire circumferential direction and by lateral main grooves that extend in a direction intersecting with the circumferential main groove and that open onto the circumferential main groove; and raised bottom portions that are provided at the tread at end portions of the lateral main grooves where the lateral main grooves open onto the circumferential main groove, that are integrally provided continuously between a first of the land portions and a second of the land portions that are adjacent to each other in the tire circumferential direction at each of the lateral main grooves, and that are each formed with a top face forming a bottom surface of the lateral main groove and configured by a sloping face that slopes in a tread depth direction as the top face extends away from the first land portion and the second land portion, respectively.

In the pneumatic tire according to the ninth aspect includes the lateral main grooves formed to the tread extending in a direction intersecting with the circumferential main groove and open onto the circumferential main groove, and also includes the raised bottom portions each formed with a top face that configures the bottom surface of the lateral main groove of the end portion opening towards the circumferential main groove, and that is configured by a sloping face that slopes in the tread depth direction as the top face extends away from the first land portion and the second land portion, respectively. Water between the tread and the road surface can accordingly be discharged through the lateral main grooves to the main grooves during wet weather running. Wet weather performance can accordingly be secured.

In the pneumatic tire according to the ninth aspect, the raised bottom portions are at end portions of the lateral main grooves where the lateral main grooves open onto the circumferential main groove, integrally provided continuously between a first of the land portions and a second of the land portions, and each formed with a top face of the raised bottom portion configured by a sloping face. Localized stretching of the end portions of blocks and localized abrasion against the road surface during ground contact of the tread is accordingly reduced. Uneven wear resistance performance can accordingly be secured.

It is thereby possible to achieve both wet weather performance and uneven wear resistance performance with the pneumatic tire according to the ninth aspect.

A tenth aspect of the present invention is a pneumatic tire according to the ninth aspect wherein: the lateral main grooves extend at an angle to a tire width direction; the first land portion is positioned on an acute angle side of an intersection angle at each of the bottom rising portions between the circumferential main groove and the lateral main groove; the second land portion is positioned on an obtuse angle side of the intersection angle; the sloping face intersects with the tire circumferential direction as viewed from the lateral main groove extension direction; and the raised bottom portions overlap with each other along the tire width direction at side walls respectively extending out from the first land portion and the second land portion.

In the pneumatic tire according to the tenth aspect, the lateral main grooves extend at an angle to the tire width direction and so water discharge performance is high. The sloping face intersects with the tire circumferential direction as viewed from the lateral main groove extension direction, and the raised bottom portions overlap with each other along the tire width direction at side walls respectively extending out from the first land portion and the second land portion. The raised bottom portions are accordingly able to support each other against force input in the tire width direction. The end portions of the land portions on the acute angle side accordingly do not readily tilt over when a large slip angle is input to the tire. The wet weather performance and uneven wear resistance performance can accordingly be raised further.

An eleventh aspect of the present invention is the pneumatic tire according to the tenth aspect wherein at the raised bottom portions the sloping face extending out from the second land portion extends between the first land portion and the circumferential main groove.

In the pneumatic tire according to the eleventh aspect, at the bottom rising portion, the sloping face extending out from the second land portion is provided so as to extend between the first land portion and the circumferential main groove. The first land portion positioned on the acute angle side is therefore supported by the second land portion positioned on an obtuse angle side when a large slip angle is imparted to the tire, enabling tilting over to be suppressed.

A twelfth aspect of the present invention is the pneumatic tire according to any one aspect of the ninth aspect to the eleventh aspect further including: a rib that extends in the tire circumferential direction and is provided adjacent in the tire width direction to the land portions; and a circumferential sipe that is provided between the rib and the land portions and that is formed so as to be shallower than the lateral main grooves.

In the pneumatic tire according to the twelfth aspect, the wet weather performance can be raised even further by water discharge performed during wet weather running by the circumferential sipe provided between the rib and the land portions. The circumferential sipe is formed so as to be shallower than the lateral main groove and so the land portions are reinforced by the rib. Uneven wear resistance performance can accordingly be raised even further.

Advantageous Effects of Present Invention

As explained above, according to the pneumatic tire of the first aspect of the present invention, the advantageous effect is obtained of being able to achieve both wet weather performance and steering stability performance.

According to the pneumatic tire of the second aspect of the present invention the advantageous effect is obtained of being able to secure water discharge performance from the lateral main grooves to the circumferential main grooves, and being able to secure steering stability performance.

According to the pneumatic tire of the third aspect of the present invention the advantageous effect is obtained of being able to support the first land portion positioned on the acute angle side with the second land portion positioned on the obtuse angle side, enabling tilting over to be suppressed.

According to the pneumatic tire of the fourth aspect of the present invention the advantageous effect is obtained of being able to further suppress tilting over of the land portions when a large slip angle is imparted to the tire.

According to the pneumatic tire of the fifth aspect of the present invention the advantageous effect is obtained of being able to achieve both a high level of both wet weather performance and steering stability performance.

According to the pneumatic tire of the sixth aspect of the present invention the advantageous effect is obtained of being able to achieve both water discharge performance in the lateral main grooves and steering stability performance.

According to the pneumatic tire of the seventh aspect of the present invention the advantageous effect is obtained of being able to achieve both water discharge performance inside the lateral main grooves and steering stability performance.

According to the pneumatic tire of the eighth aspect of the present invention the advantageous effect is obtained of being able to being able to secure water discharge performance of the lateral main grooves and being able to suppress tilting over of the land portions on the acute angle side.

According to the pneumatic tire of the ninth aspect of the present invention the advantageous effect is obtained of being able to achieve both wet weather performance and uneven wear resistance performance.

According to the pneumatic tire of the tenth aspect of the present invention the advantageous effect is obtained of being able to achieve higher wet weather performance and uneven wear resistance performance.

According to the pneumatic tire of the eleventh aspect of the present invention the advantageous effect is obtained of being able to support the first land portion positioned on the acute angle side with the second land portion positioned on the obtuse angle side when the tire is imparted with a large slip angle, enabling tilting over to be suppressed.

According to the pneumatic tire of the twelfth aspect of the present invention the advantageous effect is obtained of being able to achieve further raised water discharge performance and steering stability performance.

BRIEF DESCRIPTION OF DRAWINGS

FIG. 1 to FIG. 3 are of a first exemplary embodiment;

FIG. 1 is a plan view illustrating a tread pattern of a pneumatic tire.

FIG. 2 is an enlarged perspective view illustrating a structure of an intersection section.

FIG. 4 to FIG. 6 are of a second exemplary embodiment;

FIG. 4 is a plan view and cross-section illustrating a tread pattern of a pneumatic tire.

FIG. 5 is an enlarged perspective view illustrating a structure of a raised bottom portion.

DESCRIPTION OF EMBODIMENTS

Explanation follows regarding exemplary embodiments of the present invention, with reference to the drawings.

First Exemplary Embodiment

Figure 1:
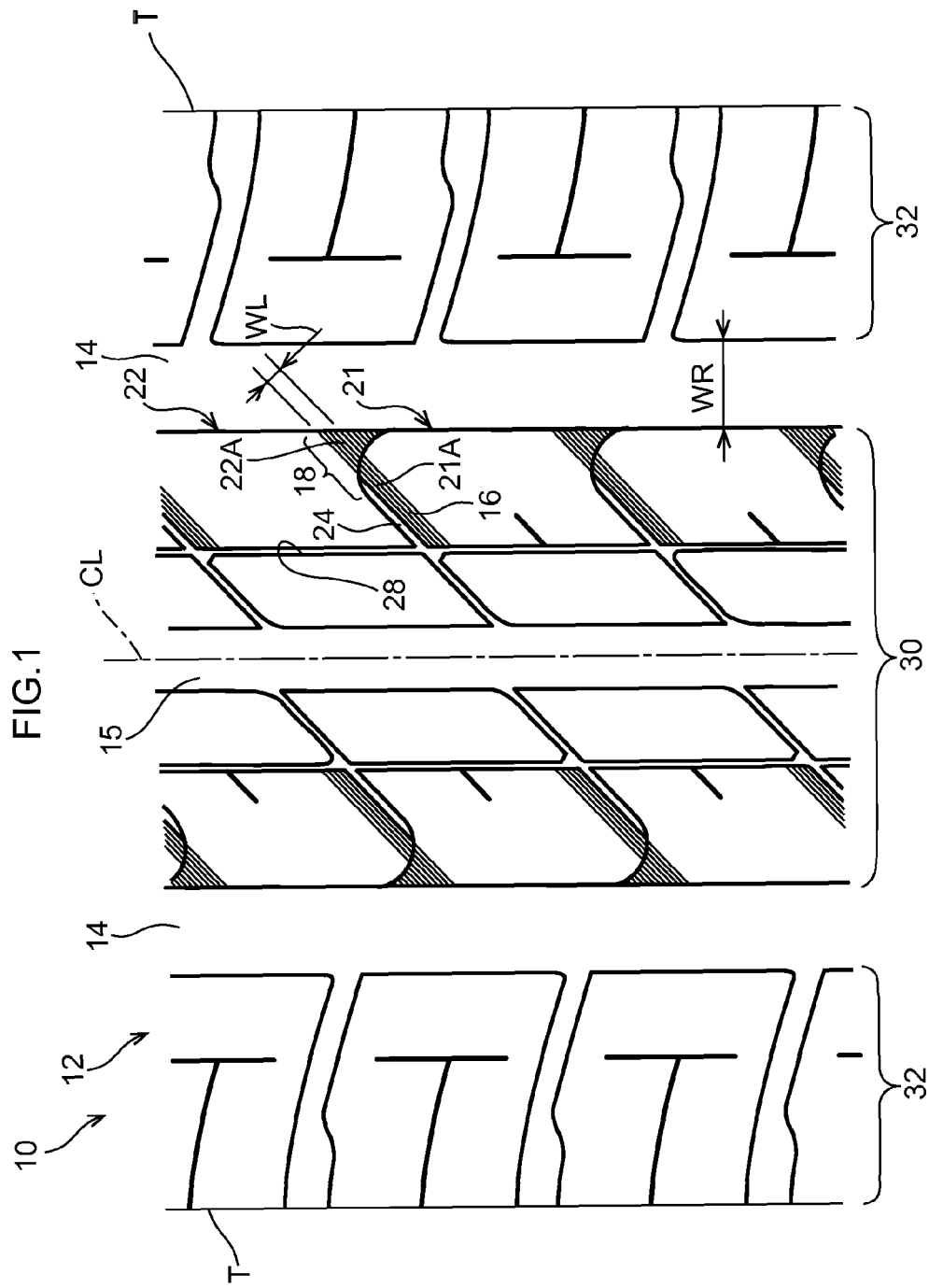

FIG. 1 illustrates a pneumatic tire 10 according to the present exemplary embodiment, including: land portions 21, 22 provided at a tread 12 and segmented by circumferential main grooves 14, 15 extending along a tire circumferential direction and lateral main grooves 16 extending in a direction intersecting with the circumferential main groove 14 and opening onto the circumferential main grooves 14; and intersection portions 18 provided at the tread 12 at end portions where the lateral main grooves 16 open onto the circumferential main grooves 14 and a first land portion 21 and a second land portion 22 adjacent to each other in the tire circumferential direction intersect with the lateral main grooves 16, such that the first land portion 21 and the second land portion 22 support each other in the tire width direction. The lateral main grooves 16 open onto the circumferential main grooves 14 means that communication between the lateral main grooves 16 and the circumferential main grooves 14 is secured when in ground contact.

The circumferential main groove 15 is for example a single groove positioned on the tire equatorial plane CL. The circumferential main grooves 14 are positioned in the tire width direction between the circumferential main groove 15 and the ground contact edge T. The lateral main grooves 16 extend at an angle to the tire width direction. The first land portions 21 and the second land portions 22 are configured in a central land portion region 30 in the vicinity of the tire equatorial plane CL. Shoulder land portion regions 32 are also provided at the tread 12 at positions further to the tire width direction outside than the central land portion region 30.

The ground contact edge T is defined as the outermost edge in the tire width direction when the pneumatic tire 10 is mounted to a standard rim, as defined in the JATMA YEAR BOOK (2009 edition, Japan Automobile Tire Manufacturers Association standards), inflated to an internal pressure of 100% of the air pressure (maximum pressure) corresponding to maximum load capability (load shown in bold type in the internal pressure-load capability chart) in the JATMA YEAR BOOK for the applicable size/ply rating, and loaded to the maximum load capability. Where the location of use or manufacturing location uses TRA standards or ETRTO standards then these respective standards are applied for the rim, the internal pressure and the loading.

In FIG. 1, the width WL of the lateral main grooves 16 is for example 5% to 60% of the width WR of the circumferential main grooves 14. The lower limit to the WL/WR percentage is set at 5% since the groove volume is reduced and water discharge performance deteriorate significantly below this level. The upper limit is set at 60% since the rigidity falls and the steering stability performance deteriorates above this level. A high level of both wet weather performance and steering stability performance can be achieved by appropriately setting the proportion of the width WL of the lateral main grooves 16 with respect to the width WR of the circumferential main grooves 14 in this manner.

Figure 3A:
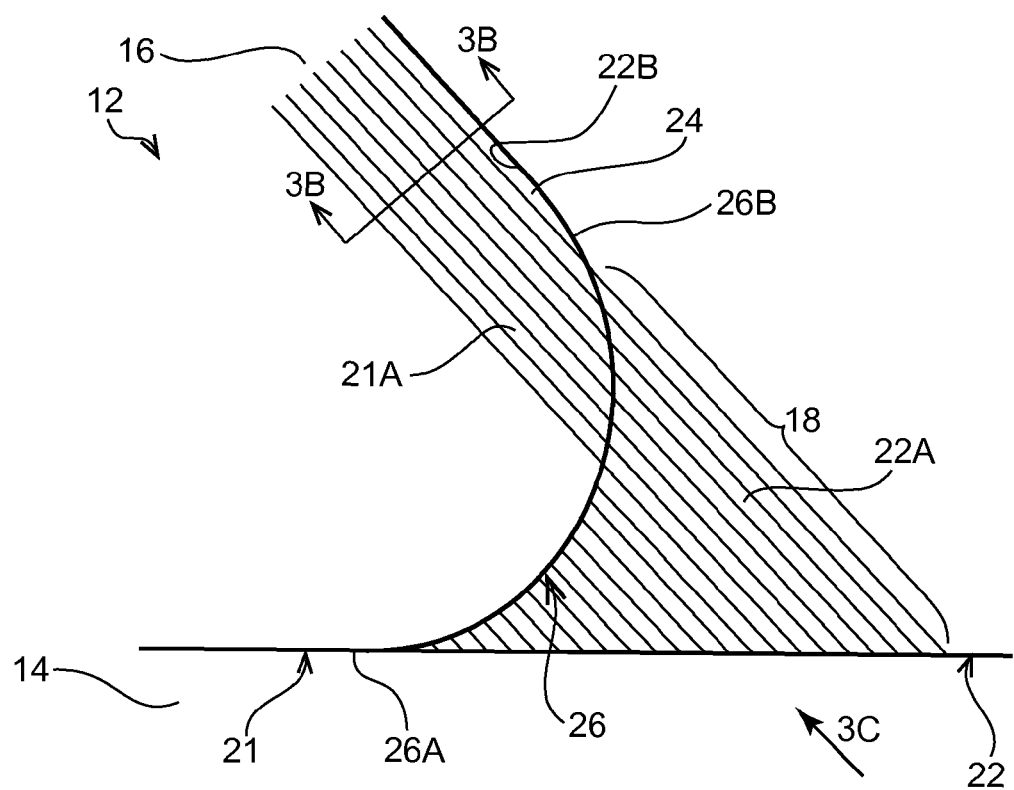
FIG. 3A is an enlarged plan view illustrating a structure of an intersection section.
Figure 3B:
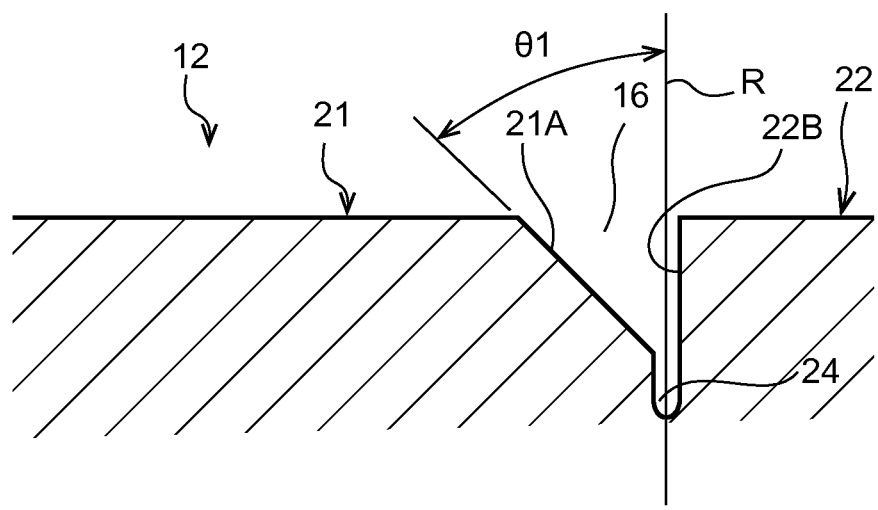
FIG. 3B is a cross-section taken on arrow 3B-3B of FIG. 3A, and illustrating a lateral main groove with a first sloping face on a side wall.
Figure 3C:
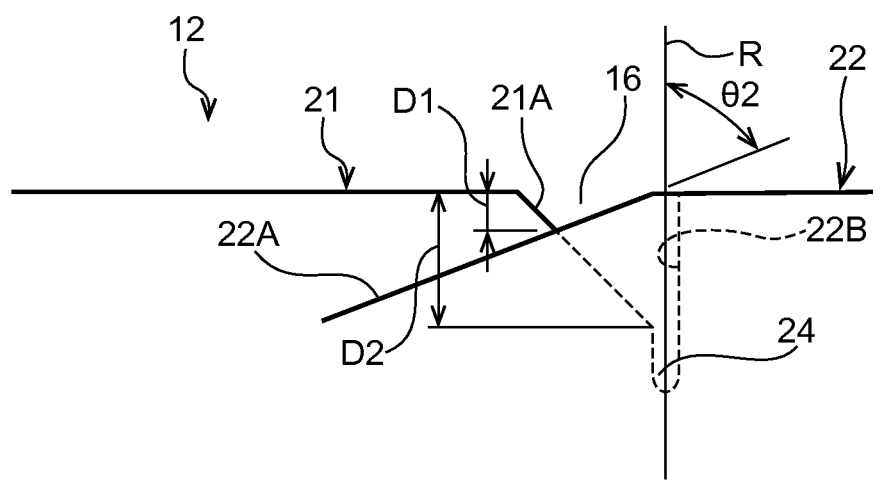
FIG. 3C is a diagram as viewed along arrow 3C in FIG. 3A, illustrating a lateral main groove with a first sloping face and a second sloping face as side walls.

In FIG. 3C, a depth D1 of the lateral main grooves 16 at the intersection portions 18 is for example 10% to 90% of a depth D2 of the lateral main grooves 16 at locations other than at the intersection portions 18. The lower limit of the percentage of D1/D2 is set at 10% since the groove volume inside the lateral main groove 16 decreases and water discharge performance deteriorates below this level. The upper limit is set at 90% since the rigidity falls and steering stability performance deteriorates above this level. Both water discharge performance in the lateral main groove 16 and steering stability performance can be achieved by appropriately setting the proportion of the depth D1 of the lateral main grooves 16 at the intersection portions 18 with respect to the depth D2 of the lateral main grooves 16 at locations other than at the intersection portions 18 on this manner.

As illustrated in FIG. 1, each of the first land portions 21 is positioned on an acute angle side of the intersection angle at the intersection portions 18 between the circumferential main groove 14 and the lateral main groove 16. Each of the second land portions 22 is positioned on an obtuse angle side of the intersection angle, and extends between the first land portion 21 and the circumferential main groove 14. The first land portion 21 and the second land portion 22 are connected at the intersection portion 18. Reference here to "connected" means that the first land portion 21 and the second land portion 22 are integrally formed and not separated at their boundary 26. There are accordingly no such features as sipes or fine grooves formed at the boundary 26.

As illustrated in FIG. 2 and FIG. 3, at each of the intersection portions 18 a first sloping face 21A is formed at the first land portion 21, sloping in a tread depth direction towards the second land portion 22 side. At each of the intersection portions 18 there is also a second sloping face 22A (FIG. 3C) formed at the second land portion 22, sloping in the tread depth direction towards the first land portion 21 side, and intersecting with the first sloping face 21A as viewed from an extension direction of the lateral main groove 16 (the arrow 3C direction in FIG. 3A). The first sloping face 21A and the second sloping face 22A configure groove walls of the lateral main groove 16 at the intersection portion 18. In FIG. 1 and FIG. 3, the parallel narrow lines on the first land portion 21 indicate the first sloping face 21A, and the parallel narrow lines on the second land portion 22 indicate the second sloping face 22A.

Note that the first sloping face 21A is formed as far as regions other than the intersection portion 18, and configures a groove wall of the lateral main groove 16. In the illustrated example, a single fine groove 28 is for example formed to the central land portion region 30 so as to extend in the tire circumferential direction. The first sloping face 21A ends at the position of the fine groove 28 on the tire equatorial plane CL side. In other words, the lateral main grooves 16 are provided in a range between the fine groove 28 and the circumferential main grooves 14.

In FIG. 2 and FIG. 3A, the boundary 26 of the first land portion 21 and the second land portion 22 curves so as to be convex on the second land portion 22 side. A first end 26A of the boundary 26 ends on contact with a side portion of the first land portion 21 (the groove wall of the circumferential main grooves 14). A second end 26B of the extension line of the boundary 26 crosses the intersection portion 18, and contacts a side wall 22B of the second land portion 22, and continuous as the side wall 22B. A state is accordingly achieved in which the second sloping face 22A of the second land portion 22 extends between the first land portion 21 and the circumferential main groove 14.

In FIG. 3B, the slope angle $\theta 1$ of the first sloping face 21A with respect to a tire radial direction R is for example 0° to 60°. The lower limit of the slope angle $\theta 1$ is set as 0° since the groove volume of the lateral main groove 16 is reduced and water discharge performance deteriorates below this level. The upper limit is set at 60° since rigidity falls and steering stability performance deteriorates above this level. By appropriately setting the slope angle $\theta 1$ in this manner, both water discharge performance inside the lateral main groove 16 and steering stability performance can be achieved.

In FIG. 3C, the slope angle $\theta 2$ of the second sloping face 22A with respect to the tire radial direction R is for example set at 10° to 80°. The lower limit of the slope angle $\theta 2$ is set as 10° since below this level tilting over of the first land portion 21 (the obtuse angle side land portion) becomes large when imparted with a large slip angle. The upper limit is set as 80° since the water discharge performance from the lateral main groove 16 to the circumferential main groove 14 deteriorates above this limit. By setting the slope angle $\theta 2$ appropriately in this manner, tilting over of the first land portion 21 (the obtuse angle side land portion) can be suppressed while also suppressing any reduction in water discharge performance of the lateral main groove 16.

As illustrated in FIG. 3B and FIG. 3C, the groove walls configuring the lateral main grooves 16 at locations other than at the intersection portions 18 are the first sloping face 21A and the side wall 22B on the first land portion 21 side of the second land portions 22. In the present exemplary embodiment, the side walls 22B are for example substantially parallel to the tire radial direction R. The angle of the lateral main grooves 16 at locations other than at the intersection portions 18 is accordingly asymmetrical about the tire radial direction R, as illustrated in FIG. 3B. Note that the side wall 22B may however be configured as a sloping face such that the side wall 22B and the first sloping face 21A are symmetrical.

As illustrated in FIG. 3B and FIG. 3C, sipes 24 are formed in the bottom portion of the lateral main grooves 16 at locations other than at the intersection portions 18. As illustrated in FIG. 3A, each of the boundaries 26 between the first land portions 21 and the second land portions 22 cuts across the sipe 24. This accordingly results in state in which the sipe 24 ends at the position of the boundary 26, and the sipe 24 is not formed in the intersection portion 18. Note that in the illustrated example, the sipe 24 opens onto the circumferential main groove 15 positioned on the tire equatorial plane CL.

In the present exemplary embodiment, plural of the intersection portion 18 are provided at appropriate intervals along the tire circumferential direction. The land portions provided with the intersection portions 18 are not limited to the central land portion region 30, and may also be provided at the shoulder land portion regions 32.

Operation

Explanation follows regarding operation of the present exemplary embodiment configured as described above. In the pneumatic tire 10 according to the present exemplary embodiment illustrated in FIG. 1 to FIG. 3, the lateral main grooves 16 formed in the tread 12 extend in a direction intersecting with the circumferential main grooves 14 and open onto the circumferential main groove 14. Water between the tread 12 and the road surface during wet weather running is accordingly discharged to the circumferential main groove 14 through the lateral main grooves 16. The wet weather performance can therefore be secured.

Moreover, in the tread 12 the intersection portions 18 are provided at end portions of the lateral main grooves 16 where they open onto the circumferential main grooves 14 such that the first land portion 21 and the second land portion 22 adjacent to each other in the tire circumferential direction at each of the lateral main grooves 16 intersect so as to support each other in the tire width direction. Hence, the end portions on the circumferential main groove 14 side of the land portions do not readily tilt over even when a large slip angle is imparted to the tire. Steering stability performance can accordingly be secured.

Specifically, as viewed along the extension direction of the lateral main groove 16, the first sloping face 21A of the first land portion 21 and the second sloping face 22A of the second land portion 22 intersect with each other, and the first sloping face 21A and the second sloping face 22A configure the side walls of the lateral main groove 16 at the intersection portion 18. Water discharge performance from the lateral main groove 16 to the circumferential main groove 14 can accordingly be secured.

The second land portion 22 is positioned at the obtuse angle side of the intersection portion 18, and extends between the first land portion 21 positioned at the acute angle side and the circumferential main groove 14. The first land portion 21 positioned on the obtuse angle side is accordingly supported by the second land portion 22 positioned on the acute angle side when a large slip angle is imparted to the tire, enabling tilting over to be suppressed. In particular, the first land portion 21 and the second land portion 22 are connected together at the intersection portion 18, and so the land portion rigidity at the intersection portion 18 is high, resulting in an even higher tilting over suppression effect. The first land portion 21 and the second land portion 22 support each other in the tire width direction, and hence tilting over of the end portions on the circumferential main groove 14 side of the land portions 21, 22 can be suppressed, enabling steering stability performance to be secured. Note that the second land portion 22 includes the second sloping face 22A at the intersection portion 18, and so uneven wearing of the second land portion 22 at the intersection portion 18 is also suppressed.

As illustrated in FIG. 3B, the groove wall angle of the lateral main groove 16 is asymmetrical, and so localized low rigidity at the end portion of the lateral main groove 16 (the intersection portion 18) can be reinforced whilst maintaining ground contact surface area at the second land portion 22. Note that when the first land portion 21 and the second land portion 22 are sloped in the opposite directions thereto at the end portion of the lateral main groove 16, as long as they are supporting each other both water discharge performance and land portion rigidity can be achieved irrespective of whether or not the groove wall angle of the lateral main groove 16 is symmetrical.

The pneumatic tire 10 according to the present exemplary embodiment is thus able to achieve both wet weather performance and steering stability performance.

The rotation direction of the pneumatic tire 10 is not limited to a single direction. Moreover, in the present exemplary embodiment, the first land portion 21 is positioned on the acute angle side of the intersection angle between the circumferential main groove 14 and the lateral main groove 16 at the intersection portion 18, and the second land portion 22 is positioned at the obtuse angle side of the intersection angle. However this is merely an expression of the positional relationship between the land portions 21, 22 adjacent to each other at each of the lateral main grooves 16, when looking at each of the respective lateral main grooves 16. Hence, as illustrated in FIG. 1, for a given first land portion 21, one tire circumferential direction end portion is positioned on the acute angle side, however the other end portion is positioned on the obtuse angle side. With respect to a given second land portion 22, one tire circumferential direction end portion is also positioned on the acute angle side and the other end portion on the acute angle side.

Modified Examples of the First Exemplary Embodiment

The first sloping face 21A is formed at the first land portion 21, and the second sloping face 22A is formed at the second land portion 22, however there is no limitation thereto. A structure not formed with the first sloping face 21A or the second sloping face 22A may be employed as long as the lateral main grooves 16 open onto the circumferential main groove 14, and there are intersection portions 18 where the first land portion 21 and the second land portion 22 support each other in the tire width direction.

Although the lateral main grooves 16 are set at an angle with respect to the tire width direction there is no limitation thereto and the lateral main grooves 16 may be configured parallel to the tire width direction. In such cases, the rigidities at the end portion on the circumferential main groove 14 side of a given lateral main groove 16 are the same as each other, and so selection may be made as to which of the land portions adjacent at the lateral main groove 16 is the first land portion 21 and which is the second land portion 22.

Configuration here is made such that the first land portions 21 and the second land portions 22 are connected at the intersection portions 18, however there is no limitation thereto. A sipe or the like may be provided at the boundary 26 between the first land portion 21 and the second land portion 22 (not shown in the drawings).

Other than a straight line profile, the cross-sectional profiles of the first sloping face 21A and the second sloping face 22A may also be a circular arc profile, a bent line profile, a stepped profile or any combination thereof. The boundary 26 between the first land portion 21 and the second land portion 22 here is curved so as to be convex on the second land portion 22 side, however the profile of the boundary 26 is not limited thereto.

Numerical ranges are indicated in relation to each of the dimensions for the width WL and the depth D1 of the lateral main groove 16 at the intersection portion 18, the slope angle θ1 of the first sloping face 21A and the slope angle θ2 of the second sloping face 22A of the lateral main groove 16 at the intersection portion 18, however these indicate preferably conditions, and some or all of these dimensions may be set outside of these numerical ranges.

Other profiles in the tread 12 illustrates in FIG. 1 are merely examples thereof, and there is no limitation to the profiles illustrated in the drawing.

Second Exemplary Embodiment

In FIG. 4 and FIG. 6, a pneumatic tire 100 according to the present exemplary embodiment includes land portions (first land portions 21 and second land portions 22) that are provided at a tread 12 and segmented by circumferential main grooves 14, 15 extending along a tire circumferential direction and lateral main grooves 16 extending in a direction intersecting with the circumferential main grooves 14 and opening onto the circumferential main grooves 14, and raised bottom portions 118 that are also provided at the tread 12.

The raised bottom portions 118 are each integrally provided at the end portion of the lateral main groove 16 where the lateral main groove 16 opens onto the circumferential main groove 14, continuously between one of the first land portions 21 and one of the second land portions 22 that are adjacent to each other in the tire circumferential direction at each of the lateral main grooves 16. The raised bottom portions 118 are formed by top faces forming the bottom surface of the lateral main grooves 16 configured as sloping faces that each slope in the tread depth direction as the top faces extend out respectively from the first land portion 21 and the second land portion 22. These sloping faces are referred to as a first sloping face 21A and a second sloping face 22A, described later.

The circumferential main groove 15 is a single groove positioned for example on the tire equatorial plane CL. The circumferential main grooves 14 are positioned in the tire width direction between the circumferential main groove 15 and ground contact edges T. The first land portion 21 and the second land portion 22 extend at an angle to the tire width direction. The first land portion 21 and the second land portion 22 are configured in the central land portion region 30 near to the tire equatorial plane CL. Shoulder land portion regions 32 are also provided at the tread 12 at positions further to the tire width direction outside than the central land portion region 30.

The ground contact edge T is defined as the outermost edge in the tire width direction when the pneumatic tire 10 is mounted to a standard rim, as defined in the JATMA YEAR BOOK (2011 edition, Japan Automobile Tire Manufacturers Association standards), inflated to an internal pressure of 100% of the air pressure (maximum pressure) corresponding to maximum load capability (load shown in bold type in the internal pressure-load capability chart) in the JATMA YEAR BOOK for the applicable size/ply rating, and loaded to the maximum load capability. Where the location of use or manufacturing location uses TRA standards or ETRTO standards then these respective standards are applied for the rim, the internal pressure and the loading.

Figure 6A:
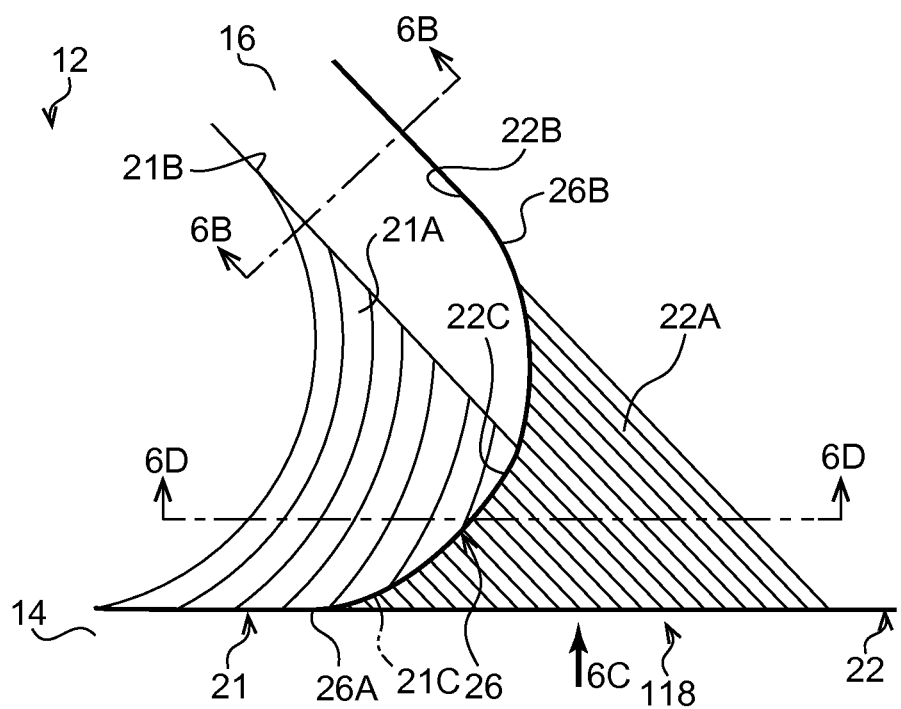
FIG. 6A is an enlarged plan view illustrating a structure of a raised bottom portion.

As illustrated in FIG. 4, each of the first land portions 21 is positioned on the acute angle side (the angle α side) of the intersection angle between the circumferential main groove 14 and the lateral main groove 16 at the raised bottom portions 118. Each of the second land portions 22 is disposed on the obtuse angle side (the angle β side) of the intersection angle. As illustrated in FIG. 6A, at the raised bottom portions 118 there is overlap in the tire width direction at side walls 21C, 22C extending respectively from the first land portion 21 and the second land portion 22. The first land portions 21 and the second land portions 22 are connected together at the intersection portion 18 (see FIG. 6D). Reference here to "connected" means that the first land portion 21 and the second land portion 22 are integrally formed and not separated at their boundary 26. There are accordingly no such features as sipes or fine grooves formed at the boundary 26. A side wall 21C is not a location appearing as a profile.

As illustrated in FIG. 5 and FIG. 6, the first sloping face 21A is formed at the first land portion 21 as a sloping face configuring a top face of the raised bottom portion 118 and sloping in the tread depth direction towards the second land portion 22 side. The second sloping face 22A is also formed at the second land portion 22 as a sloping face configuring a top face of the raised bottom portion 118 and sloping in the tread depth direction towards the first land portion 21 side (see FIG. 6C). The first sloping face 21A and the second sloping face 22A intersect with each other in the tire circumferential direction as viewed from the lateral main groove 16 extension direction (see FIG. 6D). The first sloping face 21A and the second sloping face 22A, as illustrated in FIG. 6C, configure the bottom surface of the lateral main groove 16 at the raised bottom portion 118.

In FIG. 4 and FIG. 6, the curved narrow lines on the first land portion 21 indicate the first sloping face 21A, and the parallel narrow lines on the second land portion 22 indicate the second sloping face 22A. These narrow lines each represent a line of equal height with respect to the tread surface, and the first sloping face 21A has a curved face profile (for example a circular conical face profile) at the acute angle end of the first land portion 21 (not shown in the drawings) so as to form a beveled location. The second sloping face 22A has a flat plane profile.

As illustrated in FIG. 4, ribs 110 are provided at the tread 12, extending in the tire circumferential direction and positioned in the tire width direction adjacent to the first land portions 21 and the second land portions 22 in the tire width direction. The ribs 110 are provided between the first land portions 21 and the second land portions 22 and a circumferential main groove 15 positioned on the tire equatorial plane CL. In other words, the ribs 110 are adjacent on the tire width direction opposite side of the raised bottom portion 118 with respect to the first land portions 21 and the second land portions 22. A circumferential sipe 128 formed so as to be shallower than the lateral main grooves 16 is provided between each of the ribs 110 and the first land portions 21 and the second land portions 22. For example, the width of the circumferential sipe 128 is 1 mm and the depth is 2 mm, in contrast to a width of the lateral main grooves 16 of 2 mm and a depth of 8 mm. The first land portion 21 and the second land portion 22 are effectively a single unit with the rib 110.

The lateral main grooves 16 end at the position of the circumferential sipe 128 on the tire equatorial plane CL side. In other words, each of the lateral main grooves 16 is provided in a range between the circumferential sipe 128 and the circumferential main groove 14, and the raised bottom portion 118 is provided at the end portion that opens onto the circumferential main groove 14.

Figure 6B:
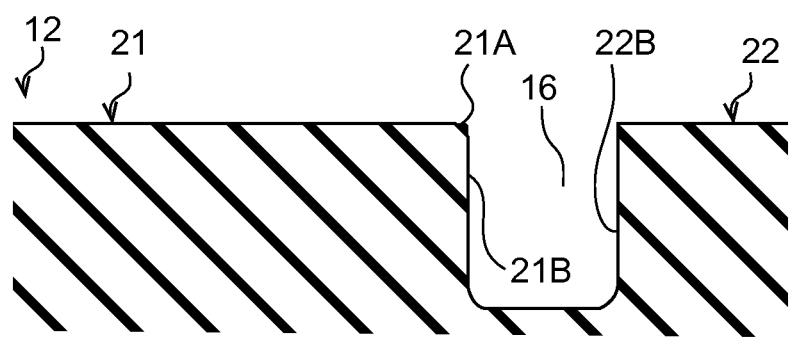
FIG. 6B is a cross-section taken on arrow 6B-6B of FIG. 6A, illustrating a lateral main groove with a first sloping face on a side wall.
Figure 6C:
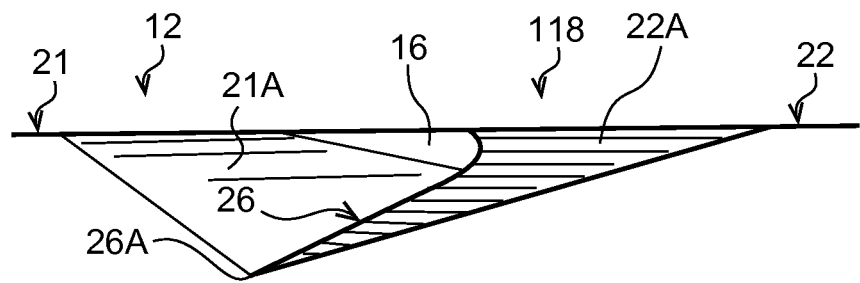
FIG. 6C is a diagram as viewed along arrow 6C in FIG. 6A, illustrating a lateral main groove with a first sloping face and a second sloping face as side walls.
Figure 6D:
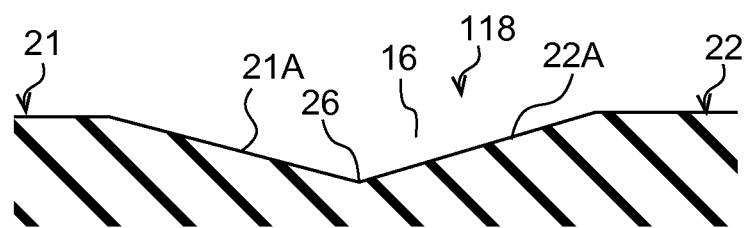
FIG. 6D is an end face cross-section as viewed on arrow 6D-6D of FIG. 6A, illustrating raised bottom portions.

In FIG. 5, FIG. 6A and FIG. 6C, the boundary 26 between the first land portion 21 and the second land portion 22 is curved so as to be convex on the second land portion 22 side. A first end 26A of the boundary 26 ends on contact with a groove wall of the circumferential main groove 14. A second end 26B of the extension line of the boundary 26 crosses the intersection portion 18, and contacts a side wall 22B of the second land portion 22, and continuous as the side wall 22B. At the raised bottom portion 118, a state according arises in which the second sloping face 22A extending out from the second land portion 22 extends between the first land portion 21 and the circumferential main groove 14.

As illustrated in FIG. 6B, the groove walls configuring the lateral main grooves 16 at locations other than at the intersection portions 18 are each configured by a side wall 21B of the first land portion 21 and a side wall 22B of the second land portion 22 facing the side wall 21B.

In the present exemplary embodiment, plural of the raised bottom portions 118 are provided at appropriate intervals in the tire circumferential direction. Note that the land portion where the raised bottom portions 118 are provided is not limited to the central land portion region 30 and provision may also be made in the shoulder land portion regions 32.

Operation

Explanation follows regarding operation of the present exemplary embodiment configured as described above. In the pneumatic tire 100 according to the present exemplary embodiment illustrated in FIG. 4 to FIG. 6, the lateral main grooves 16 are formed in the tread 12, and the lateral main grooves 16 are set at an angle to the tire width direction. The lateral main grooves 16 also extend in a direction intersecting with the circumferential main grooves 14 and open onto the circumferential main groove 14. The raised bottom portions 118 are further provided at the end portions of the lateral main groove 16 where the lateral main grooves 16 open onto the circumferential main groove 14. The top faces of the raised bottom portions 118 are formed as sloping faces (the first sloping face 21A and the second sloping face 22A) that respectively slope in the tread depth direction as they extend out respectively from the first land portion 21 and the second land portion 22. Namely, an opening from the lateral main grooves 16 towards the circumferential main groove 14 is secured. Water between the tread and the road surface during wet weather running is accordingly discharged through the lateral main grooves 16 to the circumferential main grooves. Good wet weather performance (in particular braking performance) can therefore be secured.

The raised bottom portions 118 are integrally provided at the end portions of the lateral main grooves 16 where the lateral main grooves 16 open onto the circumferential main groove 14, so as to connect between the first land portion 21 and the second land portion 22, and each of the top faces of the raised bottom portions 118 is formed by the sloping faces described above (the first sloping face 21A and the second sloping face 22A). Localized stretching of the end portions of the land portions and localized abrasion against the road surface therefore does not readily occur during ground contact of the tread 12. The uneven wear resistance performance can accordingly be raised.

Specifically, in comparison to cases in which portions of the raised bottom portions 118 are configured by ribs that make ground contact (not shown in the drawings), the raised bottom portions 118 do not make ground contact due to provision of the first sloping face 21A and the second sloping face 22A to each of the raised bottom portions 118. Moreover, the first sloping face 21A is at a location where the acute angle end (not shown in the drawings) of the first land portion 21 is beveled with a curved face profile, and so the acute angle end can be suppressed from making ground contact. The durability of the end portions of the land portions is accordingly raised.

The first sloping face 21A and the second sloping face 22A also intersect with the tire circumferential direction as viewed from the lateral main groove 16 extension direction, and the raised bottom portions 118 are configured with the side walls 21C, 22C that extend out respectively from the land portions 21 and the second land portions 22 overlapping with each other in the tire width direction. The raised bottom portions 118 can accordingly support each other against force input in the tire width direction. The end portions on the acute angle side of the land portions accordingly do not readily tilt over when the tire is imparted with a large slip angle.

In particular, in the present exemplary embodiment, the second sloping face 22A extending from the second land portion 22 positioned on the acute angle side extends between the first land portion 21 positioned on the obtuse angle side and the circumferential main groove 14. The first land portion 21 positioned on the acute angle side is therefore supported by the second land portion 22 positioned on the obtuse angle side when a large slip angle is imparted to the tire, enabling tilting of the first land portion 21 towards the circumferential main groove 14 side to be suppressed. The uneven wear resistance performance can accordingly be raised.

Moreover, as illustrated in FIG. 4, higher wet weather performance during wet weather running can be achieved by the circumferential sipes 128 between the ribs 110 and the land portions (the first land portions 21 and the second land portion 22). Due to the circumferential sipes 128 being shallower than the lateral main grooves 16, a configuration can be achieved in which the land portions (the first land portions 21 and the second land portions 22) do not readily tilt over towards the rib 110 side against force input in the tire width direction.

It is thus possible in the pneumatic tire 10 according to the present exemplary embodiment to achieve both wet weather performance and uneven wear resistance performance. Note that it is possible to reduce the rolling resistance due to the lateral main groove 16 being set at an angle to the tire width direction.

Note that the rotation direction of the pneumatic tire 10 is not limited to a single direction. Moreover, in the present exemplary embodiment, the first land portion 21 is positioned on the acute angle side of the intersection angle between the circumferential main groove 14 and the lateral main groove 16 at the raised bottom portion 118, and the second land portion 22 is positioned at obtuse angle side of the intersection angle. However this is merely an expression of the positional relationship between the land portions 21, 22 adjacent at a lateral main groove 16, when looking at each of the respective lateral main grooves 16. Hence, as illustrated in FIG. 4, for the first land portion 21, the end portion in one tire circumferential direction is positioned on the obtuse angle side, however the other end portion is positioned on the obtuse angle side. With respect to the second land portion 22, one end portion in the tire circumferential direction is also positioned on the acute angle side and the other end portion on the acute angle side.

Modified Examples of the Second Exemplary Embodiment

The lateral main groove 16 is set at an angle to the tire width direction, however there is no limitation thereto, and the lateral main grooves 16 may be made parallel to the tire width direction. In such cases, the rigidities at the end portion on the circumferential main groove 14 side of a given lateral main groove 16 are the same as each other, and so selection may be made as to which of the land portions adjacent at the lateral main groove 16 is the first land portion 21 and which is the second land portion 22.

At the raised bottom portions 118, the second land portions 22 positioned on the obtuse angle side extend between the first land portions 21 positioned on the obtuse angle side and the circumferential main groove 14, however there is no limitation thereto. For example, configuration may be made such that the first land portions 21 extend between the second land portion 22 and the circumferential main groove 14. The first land portion 21 and the second land portion 22 are integrally provided so as to be connected at the raised bottom portions 118. Mutual support is achievable even in such a placement against force input to each of the land portions in the tire width direction.

The ribs 110 and the circumferential sipes 128 are also provided between the first land portions 21 and the second land portions 22 and the circumferential main groove 15 positioned on the tire equatorial plane CL, however there is no limitation thereto. A structure may also be employed without the ribs 110 and the circumferential sipes 128.

Other than a straight line profile, the cross-sectional profile of the first sloping face 21A and the second sloping face 22A may also be a circular arc profile, a bent line profile, a stepped profile, or a combination thereof. The boundary 26 between the first land portion 21 and the second land portion 22 here is curved so as to be convex on the second land portion 22 side, however the profile of the boundary 26 is not limited thereto.

In FIG. 4, other profiles in the tread 12 are merely examples thereof, and there is no limitation to the profiles illustrated in the drawing.

Appropriate combinations may be made of the structures of each of the exemplary embodiments above.

Test Example

A durability test and three types of vehicle test to confirm wet weather performance (a straight line hydroplaning test, a cornering hydroplaning, and a wet braking test) are performed for an Example according to the second exemplary embodiment, and for Comparative Examples 1, 2. As illustrated in Table 1, the Example and the Comparative Examples 1, 2 differ in the profile of the top face of the raised bottom portion. A sloped face is not formed to the top face in the Comparative Example 1, and instead there is a simple raised bottom portion with a height of 5 mm to 6 mm from the groove bottom of the lateral main groove. In the Comparative Example 2, a sloped face is not formed to the top face, and instead there is a raised bottom portion with a top face that is in the same plane as the tread surface, such that the lateral main grooves are not in communication with the circumferential main grooves.

The tire size is 205/55R16, internal pressure is 230 kPa, and loading is equivalent to two occupants in the vehicle. The test results are illustrated in Table 1.

A drum test rig is employed for the durability test, plural test runs equivalent to 2500 km travel are performed, and tires in which defects occur at in the vicinity of the corners of the land portions around the raised bottom portion are denoted by G, and when no defects occur are indicated by NG.

With respect to the straight line hydroplaning test, evaluation (sensory evaluation) is made by a test driver of the feeling at the limiting speed at which hydroplaning occurs when running on a wet road with a water depth of 5 mm. NG indicates that a professional test driver feels a meaningful drop in the level of performance in comparison to the Example.

With respect to the cornering hydroplaning test, evaluation (sensory evaluation) is made by a test driver of the feeling during a cornering test when running on a wet road with a water depth of 5 mm. NG indicates that a professional test driver feels a meaningful drop in the level of performance in comparison to the Example With respect to the wet braking test, evaluation (sensory evaluation) is made by a test driver of the feeling of the braking effectiveness when running in various running modes on a circuit course in wet conditions. NG indicates that a professional test driver feels a meaningful drop in the level of performance in comparison to the Example As displayed in Table 1, defects occur at the corners of the land portions for the several tires in the durability test results for the Comparative Example 1. Such defects do not occur in the Example or in the Comparative Example 2. All of the evaluations are NG for the 3 types of vehicle test for the Comparative Example 2. All of these evaluations are G for the Example and for the Comparative Example 1. It is confirmed from these results that the tire according to the Example has superior durability and also superior wet weather performance.

TABLE 1

|  |  | Example | Comparative Example 1 | Comparative Example 2 |
|---|---|---|---|---|
| Sloping face to top face of raised bottom portion? | | Present | Not Present (simple raised bottom of 5 mm to 6 mm) | Not Present (no communication) |
| Durability Test | Defects at corners of land portions? | Not Present | Generated | Not Present |
| Vehicle Test | Straight line hydroplaning test | G | G | NG |
| | Cornering hydroplaning test | G | G | NG |
| | Wet braking test | G | G | NG |

EXPLANATION OF THE REFERENCE NUMERALS

10 pneumatic tire
12 tread
14 circumferential main groove
16 lateral main groove
18 intersection portion
21 first land portion
21A first sloping face (sloping face)
22 second land portion
22A second sloping face (sloping face)
100 pneumatic tire
110 rib
118 raised bottom portion
128 circumferential sipe
R tire radial direction
WL width of lateral main groove
WR width of circumferential main groove
θ1 slope angle of first sloping face
θ2 slope angle of second sloping face

The invention claimed is:

1. A pneumatic tire, comprising:
    land portions that are provided at a tread between a first circumferential main groove and a second circumferential main groove and are segmented by the first circumferential main groove extending along a tire circumferential direction, by a circumferential sipe, and by lateral main grooves that extend in a direction intersecting with the first circumferential main groove and that open onto the first circumferential main groove and onto the circumferential sipe; and
    raised bottom portions that are provided at the tread at end portions of the lateral main grooves where the lateral main grooves open onto the first circumferential main groove, that are integrally provided continuously between a first of the land portions and a second of the land portions that are adjacent to each other in the tire circumferential direction at each of the lateral main grooves, and that are each formed with a top face forming a bottom surface of the lateral main groove and configured by a sloping face that slopes in a tread depth direction as the top face extends away from the first land portion and the second land portion, respectively;
wherein:
    the circumferential sipe is the only circumferential sipe provided between the first circumferential main groove and the second circumferential main groove;
    the lateral main grooves extend at an angle to a tire width direction;
    the first land portion is positioned on an acute angle side of an intersection angle at each of the bottom rising portions between the first circumferential main groove and the lateral main groove;
    the second land portion is positioned on an obtuse angle side of the intersection angle;
    the sloping face of the first land portion intersects with the sloping face of the second land portion along the tire circumferential direction as viewed from the lateral main groove extension direction;
    the raised bottom portions overlap with each other along the tire width direction at side walls respectively extending out from the first land portion and the second land portion;
    at the raised bottom portions, the sloping face extending out from the second land portion extends between the first land portion and the first circumferential main groove; and
    a boundary between the first land portion and the second land portion is curved so as to be convex on the second land portion side.

2. The pneumatic tire of claim 1, further comprising:
    a rib that extends in the tire circumferential direction and is provided adjacent in the tire width direction to the land portions; and wherein
    the circumferential sipe is provided between the rib and the land portions and is formed so as to be shallower than the lateral main grooves.

3. The pneumatic tire of claim 2, wherein:
    the rib includes width direction sipes and does not include the lateral main grooves.

4. The pneumatic tire of claim 1, wherein:
    the first circumferential main groove is located at a tire width direction outer side so that the lateral main grooves open onto the first circumferential main groove at the tire width direction outer side.

5. The pneumatic tire of claim 1, wherein:
    for each one of the raised bottom portions, there is only one lateral main groove that connects thereto.

* * * * *